United States Patent [19]

Matsumoto

[11] Patent Number: 5,301,885
[45] Date of Patent: Apr. 12, 1994

[54] METHOD AND APPARATUS FOR FABRICATING UNIDIRECTIONAL MATERIALS FOR HELICOPTER PARTS

[75] Inventor: Tadahiro Matsumoto, Kanuma, Japan

[73] Assignee: Fuji Jukogyo Kabushiki Kaisha, Tokyo, Japan

[21] Appl. No.: 633,958

[22] Filed: Dec. 26, 1990

[30] Foreign Application Priority Data

Dec. 28, 1989 [JP] Japan .................. 1-341017

[51] Int. Cl.⁵ ............................................ B65H 54/64
[52] U.S. Cl. .................. 242/7.21; 156/169; 156/446
[58] Field of Search ............... 464/181, 183; 242/7.21, 242/7.22, 7.20; 156/446, 425, 169, 189

[56] References Cited

U.S. PATENT DOCUMENTS

| | | | |
|---|---|---|---|
| 3,331,722 | 7/1967 | Ponemon | 242/7.21 |
| 3,367,586 | 2/1968 | Eshbaugh | 242/2 |
| 4,080,915 | 3/1978 | Bompard et al. | 242/7.21 |
| 4,118,262 | 10/1978 | Abbott | 242/7.21 |
| 4,251,036 | 2/1981 | McLain | 242/7.21 |
| 4,288,267 | 9/1981 | McCarty | 242/7.21 |
| 4,437,616 | 3/1984 | Magarian et al. | 242/7.21 |
| 4,699,683 | 10/1987 | McCowin | 156/353 |
| 4,863,416 | 9/1989 | Gupta | 242/7.21 |
| 4,917,756 | 4/1990 | Cahuzac et al. | 242/7.21 |
| 4,954,194 | 9/1990 | Crabtree | 242/7.21 |

FOREIGN PATENT DOCUMENTS

| | | |
|---|---|---|
| 0181747 | 5/1986 | European Pat. Off. . |
| 0213816 | 3/1987 | European Pat. Off. . |
| 0284497 | 9/1988 | European Pat. Off. . |

*Primary Examiner*—Katherine Matecki
*Attorney, Agent, or Firm*—Beveridge, DeGrandi, Weilacher & Young

[57] ABSTRACT

A unidirectional material for helicopter parts is fabricated by winding a composite-material roving delivered from a feeding mechanism of a filament winding device around and between a plurality of pins provided on a mandrel rotating about the longitudinal axis thereof, the roving feeding mechanism being moved in a traversing manner such that the feeding path of the roving becomes a figure eight figure, whereby the roving is thus wound to form a tubular mesh of obliquely crossing and staggered helixes of the roving around the mandrel. The material has an improved strength in a transverse direction of the mandrel.

6 Claims, 2 Drawing Sheets

METHOD AND APPARATUS FOR FABRICATING UNIDIRECTIONAL MATERIALS FOR HELICOPTER PARTS

BACKGROUND OF THE INVENTION

The present invention relates to a method and an apparatus for producing unidirectional materials to be used for flexbeams and spars for rotor blades of helicopters. More particularly, the present invention relates to a method and an apparatus for fabricating unidirectional materials particularly for helicopter parts, which enable an improvement in the strength of the fabricated unidirectional material in all directions thereof.

Heretofore, unidirectional materials to be used for flexbeams for helicopter blades have been fabricated by a method described, for example, in Japanese Patent Laid-Open Publn. No. 1-17810 (1990). According to the known method, a composite-material roving is delivered from a feeding mechanism of a filament winding device and is wound in a ring pattern between two or more parallel pins fixedly installed at spaced-apart positions.

A unidirectional material produced by the known method has a very high tensile strength in a longitudinal direction of the wound roving. However, with respect to tensile stress in a crosswise direction, perpendicular to the longitudinal direction, the strength of the fibers is not effective. For this reason, the strength of the resin bonding the roving determines the strength of the unidirectional material in the 90-degree direction. Consequently, the strength in the 90-degree direction is extremely low. That is, the tensile strength in the 90-degree direction is of the order of 5 percent or less of the strength in the 0-degree direction.

Accordingly, it has been practical in the past to reduce the tensile stress in the crosswise direction of the unidirectional material generated by torsion in the flexbeams accompanying feathering action of the rotor.

More specifically, attempts have been made to increase the strength through such measures as relieving stress concentration due to the shape of the flexbeams and adding doublers for reinforcing weak parts.

In all of these measures, however, the aim is only to reduce internal stress by load in the resin material. Consequently, there is a limit to the effectiveness of these measures. Moreover, there arises the problems of complication of the shape of the unidirectional material and increase in the number of parts.

SUMMARY OF THE INVENTION

In view of the above described circumstances of the prior art, it is an object of the present invention to provide a method and an apparatus for fabricating a unidirectional material for helicopter parts by which the tensile strength of the material in the crosswise direction is increased without complicating the shape of the material or adding a reinforcing material.

The above stated object is achieved by a method for fabricating a unidirectional material for helicopter parts, which comprises the steps of winding a composite-material roving paid out from a roving feeding mechanism around a mandrel rotating about a longitudinal axis thereof, and traversing the roving feeding mechanism along the mandrel, an improvement of the method comprising the steps of: providing a plurality of pins projecting at two end portions of the mandrel in a radial directions thereof; and moving said roving feeding mechanism in a traversing manner such that the path of the roving takes a figure eight shape, to cause the roving to engage said pins successively as the roving is wound around the mandrel so as to form a tubular mesh of obliquely crossing and staggered helixes of the roving.

According to the present invention, there is further provided an apparatus for fabricating a unidirectional material for helicopter parts, comprising roving feeding means for feeding a composite-material roving, a mandrel, means for rotating the mandrel, and means for traversing the roving feeding means along the mandrel to cause the roving fed from the roving feeding means to be wound around the mandrel to form the unidirectional material, an improvement of the apparatus comprising: a plurality of pins provided at two end portions of the mandrel to project in the radial directions of the mandrel; and means for moving said roving feeding means in a traversing manner such that the path of the roving is in the shape of a figure eight, to form a tubular mesh of obliquely crossing and staggered helixes of the roving.

By the practice of the present invention, the tensile strength in the longitudinal direction of the unidirectional material becomes high. At the same time, a reasonably high tensile strength in the crosswise direction is obtained due to the obliquely crossing layers. Accordingly, there is no need to resort to a complicated shape of the unidirectional material or to add reinforcing material.

Preferred embodiments of the present invention will be understood from the following detailed description referring to the accompanying drawing.

DESCRIPTION OF THE PREFERRED EMBODIMENTS

Figure 1:
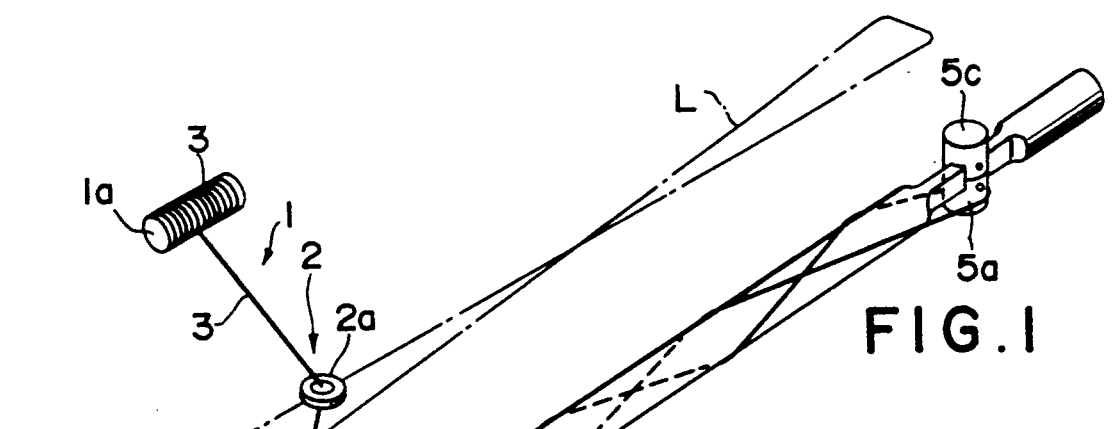
FIG. 1 is a schematic perspective view indicating a method of fabricating a unidirectional material for helicopter parts according to the present invention.

Referring first to FIG. 1, the apparatus shown schematically therein has a filament winding device 1. The device 1 is provided with a bobbin 1a on which a roving 3 of a composite material is wound. The roving 3 thus wound on the bobbin 1a is led out through a delivery eye 2a of a roving paying-out or feeding mechanism 2. The roving 3 is then wound in loop form in a manner described hereinafter around and between, for example two pairs of pins 5a, 5c and 5b, 5d projecting in opposite radial directions near respective ends of a mandrel 4, for example, of a circular cross-sectional shape. The mandrel 4 is rotatably supported and is driven in the rotational arrow direction A in FIG. 1 by a driving power source D.

Figure 2:
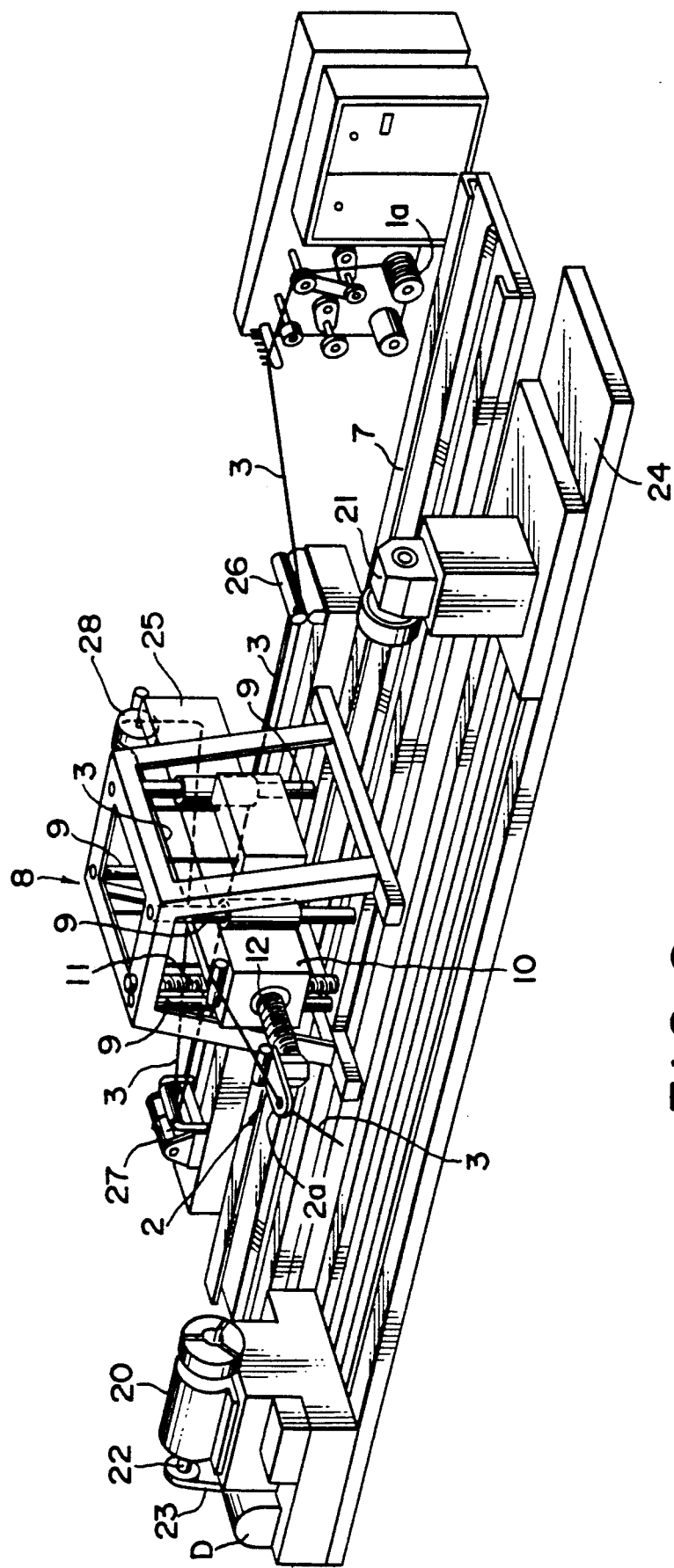
FIG. 2 is a schematic perspective view showing an apparatus for producing successive figure eight loops.

By the loop-form winding process, a specific quantity of the roving 3 is wound around the mandrel 4 in the form of a unidirectional material 6 as shown in FIG. 2. The unidirectional material 6 is thereafter taken off the mandrel 4. It is subsequently formed as a member of a flexbeam for a helicopter blade.

The delivery eye 2a of the roving feeding mechanism 2 is adapted to undergo a traverse motion such that the composite-material roving 3 will form successive figure eight loops as indicated by path L in FIG. 1. At the same time, as mentioned above, the mandrel 4 is rotated in coordination with the operation of the delivery eye 2a of the roving feeding mechanism 2. As a result, the roving 3 is wound in a tubular mesh pattern of multiple phase-lagged and obliquely crossing helixes around the mandrel 4.

The movement of the delivery eye 2a along the figure eight path L can be achieved by an apparatus indicated in FIG. 2. The apparatus shown in FIG. 2 has a bed 7 on which a carriage 8 is mounted. The carriage 8 is slidable longitudinally of the bed 7. Although not shown in FIG. 2, the bed 7 has therein a feed screw extending longitudinally of the bed and engaging a nut secured to the bottom of the carriage 8, whereby when the feed screw is rotated the carriage 8 is moved longitudinally of the bed 7. The direction of the longitudinal movement of the carriage 8 is changed depending upon the rotational direction of the feed screw.

The carriage 8 has vertical guide rods 9 fixedly secured thereto, and a subsidiary carriage 10 is supported to be slidingly moved vertically along the guide rods 9. A vertical feed screw 11 is screw-engaged with the subsidiary carriage 10 and is adapted to be rotated by a reversible motor not shown. When the motor is rotated, the subsidiary carriage 10 is adjustingly moved vertically relative to the carriage 8.

The subsidiary carriage 10 has a horizontal screw shaft 12 screw-engaged with the subsidiary carriage 10 and coupled to a reversible motor not shown. When the reversible motor is operated, the screw shaft 12 is projected or retracted relative to the subsidiary carriage 10 depending upon the rotational direction of the screw shaft 12.

The delivery eye 2a shown in FIG. 1 is supported at the distal end of the horizontal screw shaft 12 in such a manner that the attitude of the eye 2a will not change in spite of the rotation of the screw shaft 12. The delivery eye 2a is disposed in a region above a line connecting a headstock 20 and a tailstock 21. The mandrel 4 shown in FIG. 1 is rotatably supported between the headstock 20 and the tailstock 21. The headstock 20 has the driving power source D that drives a headstock spindle 22 through a power transmitting mechanism 23. The tailstock 21 is adjustingly shiftable on a bed 24 toward and away from the headstock 20.

It will be understood from the above that the delivery eye 2a can be moved along the figure eight path L (FIG. 1) by appropriately coordinating the rotation of the horizontal screw shaft 12 and the rotation of the longitudinal feed screw in the bed 7.

The subsidiary carriage 10 has a resin basin 25 containing a resin in liquid state. The roving R paid out from the bobbin 1a is passed through a guide roller 26, a tension equalizer 27 and a roller 28 into the liquid resin to be impregnated with the resin and is thereafter passed through the delivery eye 2a.

As a result of the movement of the delivery eye 2a of the feeding mechanism 2 along the figure eight path L, the roving 3 engaging with the first pin 5a, for example, is then engaged with the pin 5b, then with the pin 5c, and finally with the pin 5d. This operational action is successively repeated. The sequence with which the roving 3 engages with the four pins 5a, 5b, 5c and 5d differs with the speed of the traverse motion of the delivery eye 2a and the rotational speed of the mandrel 4. As a consequence of the rotation of the mandrel 4, the roving 3 is wound in a tubular mesh pattern comprising multiple helixes in lagged and obliquely intersecting configurating around the outer surface of the mandrel 4. At the time of doubling back in the traverse motion of the delivery eye 2a in the helical winding operation, the roving 3 engages with the nearest pin.

Such winding is continued until the specified quantity of winding has been attained and the fabrication of one unidirectional material 6 has been completed. The unidirectional material 6 is then slipped off the mandrel 4. The material 6 is subsequently formed by a known process as a member of a flexbeam for a helicopter.

Figure 3:
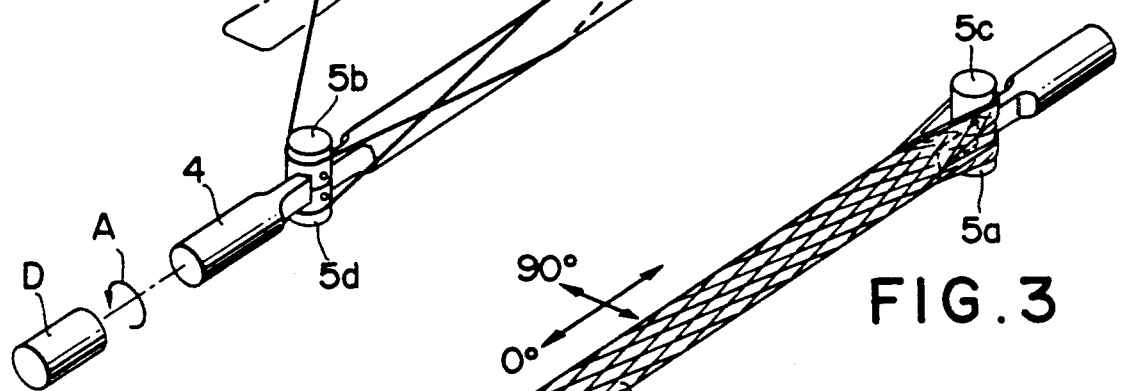
FIG. 3 is a perspective view showing a unidirectional material fabricated by the method shown in FIG. 1.

In the above described manner, the composite-material roving 3 is wound in a helical pattern around the mandrel 4 thereby to form a unidirectional material 6 having an obliquely crossing mesh of the roving. Therefore, while a high strength is preserved in the 0-degree direction (FIG. 3), reasonably high strength is afforded by the obliquely crossing mesh also in the 90-degree direction (FIG. 3).

Figure 4:
FIG. 4 is a schematic perspective view indicating another fabrication method according to the present invention.

Another embodiment of practice will now be described with reference to FIGS. 4 and 5. In this embodiment, a mandrel 14 of a cross section of partial (forward portion) airfoil shape is used. In addition, eight pins 15 (only four pins on the upper side shown in FIG. 4) are on the mandrel 14. Four of these pins 15 are provided near each end of the mandrel 14 and project outwardly therefrom. At each end of the mandrel 14, two pairs of parallel pins project perpendicularly outward from the mandrel 14 in opposite directions. In this embodiment, also, the composite-material roving 3 paid out from the feeding mechanism 2 is wound in a loop between pairs of pins at the ends of the mandrel 14 to fabricate the unidirectional material 16.

In this case, the process steps following the winding of the roving 3 are the same as those of the preceding embodiment.

Figure 5:
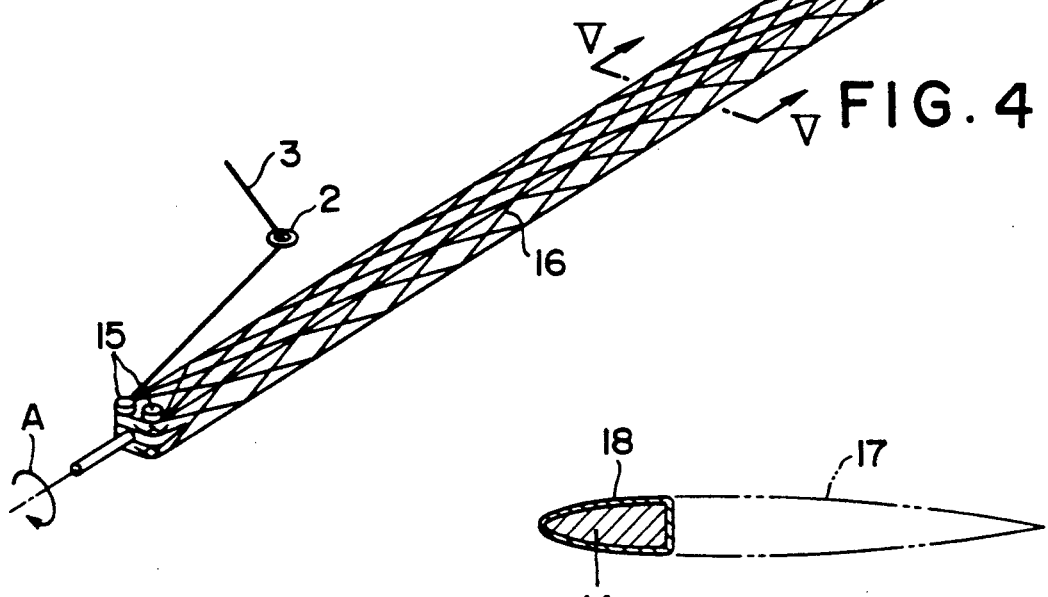
FIG. 5 is a sectional view taken along the plane indicated by line V—V in FIG. 4 and indicating its relation to an airfoil of a helicopter rotor blade.

By fabricating the unidirectional material 16 in the above described manner, the spar 18 of a helicopter rotor blade 17 as shown in FIG. 5 is produced.

As described above, according to the present invention, the roving is wound in a multiple helical pattern around the mandrel thereby to form a unidirectional material. Therefore the tensile strength of the unidirectional material thus formed in the 90-degree direction (perpendicular to its longitudinal direction) is improved without a complication of the shape of the material or an addition of reinforcing material.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An apparatus for fabricating a unidirectional material, including a mandrel having two ends, drive means for rotating said mandrel around a longitudinal axis of said mandrel, roving feeding mechanism for feeding a composite-material roving so as to be wound on said mandrel, moving means for moving said moving feeding mechanism such that said roving traverses in a figure eight between said two ends of said mandrel while said mandrel is rotated, the apparatus comprising:

first pin means disposed at one end of said mandrel; and a second pin means disposed at the opposite end of said mandrel;

each of said first and second pin means having opposite end portions projecting outwardly from a periphery of said mandrel in a single transverse imaginary plane to said longitudinal axis of said mandrel, each of said first and second pin means comprising two sets of pins, said pins of each set being disposed in parallel, one set of pins projecting in one direction in said single transverse imaginary plane, the other set of pins projecting in the opposite direction, whereby said roving is successively and alternately wound over and between said first and second pin means so as to form said unidirectional material in a tubular mesh on said mandrel and in loops around said first and second pin means.

2. The apparatus according to claim 1, wherein said set is a pair.

3. The apparatus according to claim 1, wherein said mandrel is of circular cross-sectional shape.

4. The apparatus according to claim 1, wherein said mandrel is a partial airfoil shape in cross section.

5. A method for fabricating a unidirectional material, comprising a mandrel having two ends, roving feeding mechanism for feeding a composite-material roving, the method comprising the steps of:

providing a first pin assembly disposed at one end of said mandrel and a second pin assembly disposed at the opposite end of said mandrel, each of said first and second pin assemblies having end portions projecting outwardly from a periphery of said mandrel in a single imaginary plane to said longitudinal axis of said mandrel, each of said first and second pin assemblies comprising two sets of pins, said pins of each set being disposed in parallel, one set of pins projecting in one direction in said single transverse imaginary plane, the other set of pins projecting in the opposite direction;

rotating said mandrel around a longitudinal axis of said mandrel; and winding said roving, successively and alternately, over and between said first and second pin assemblies in a figure eight so as to form said unidirectional material in a tubular mesh on said mandrel and in loops around said first and second pin assemblies.

6. The method according to claim 5, wherein said winding step further comprises the successive steps of:

engaging said roving around an end portion of a pin of a set of said first pin assembly;

engaging said roving around an end portion of a pin of a set of said second pin assembly;

engaging said roving around an end portion of a pin of the other set of said first pin assembly; and engaging said roving around an end portion of a pin of the other set of said second pin assembly.

* * * * *